US008385962B1

(12) United States Patent
Gailloux et al.

(10) Patent No.: US 8,385,962 B1
(45) Date of Patent: Feb. 26, 2013

(54) PUSH-TO-TALK VOICE MESSAGES

(75) Inventors: Michael A. Gailloux, Overland Park, KS (US); Kenneth W. Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 683 days.

(21) Appl. No.: 12/573,741

(22) Filed: Oct. 5, 2009

(51) Int. Cl.
*H04B 7/00* (2006.01)
(52) U.S. Cl. .................................. 455/518; 455/519
(58) Field of Classification Search ............... 455/412.1, 455/412.2, 413, 518–521
See application file for complete search history.

(56) References Cited

U.S. PATENT DOCUMENTS

| | | | |
|---|---|---|---|
| 6,751,468 B1 * | 6/2004 | Heubel et al. ................ | 455/518 |
| 7,107,017 B2 | 9/2006 | Koskelainen et al. | |
| 7,260,060 B1 * | 8/2007 | Abaye et al. ................ | 370/230 |
| 7,376,413 B2 * | 5/2008 | Jordan, Jr. .................. | 455/412.2 |
| 7,395,080 B2 * | 7/2008 | Chhatriwala et al. ........ | 455/518 |
| 7,466,810 B1 | 12/2008 | Quon et al. | |
| 7,546,133 B2 * | 6/2009 | Harris et al. ................ | 455/518 |
| 8,180,386 B1 | 5/2012 | Delker et al. | |
| 2004/0047303 A1 * | 3/2004 | Fernandez et al. .......... | 370/293 |
| 2005/0202806 A1 * | 9/2005 | Bourgeois et al. .......... | 455/416 |
| 2007/0049312 A1 * | 3/2007 | Villa et al. .................. | 455/516 |
| 2007/0150444 A1 | 6/2007 | Chesnais et al. | |
| 2007/0153752 A1 | 7/2007 | Donnellan | |
| 2007/0155416 A1 | 7/2007 | Donnellan | |
| 2007/0230678 A1 * | 10/2007 | Bloebaum et al. .......... | 379/211.01 |
| 2007/0266077 A1 | 11/2007 | Wengrovitz | |
| 2007/0274297 A1 * | 11/2007 | Cross et al. ................ | 370/356 |
| 2008/0101340 A1 | 5/2008 | Bernath | |
| 2008/0205608 A1 | 8/2008 | Tal et al. | |
| 2009/0111509 A1 | 4/2009 | Mednieks et al. | |
| 2009/0147778 A1 | 6/2009 | Wanless et al. | |
| 2009/0156246 A1 | 6/2009 | Toba | |
| 2009/0186606 A1 | 7/2009 | Agarwal et al. | |
| 2009/0215486 A1 | 8/2009 | Batni et al. | |
| 2010/0048235 A1 | 2/2010 | Dai et al. | |
| 2010/0124915 A1 | 5/2010 | Haitani et al. | |
| 2010/0161728 A1 | 6/2010 | Drozt et al. | |
| 2011/0264733 A1 | 10/2011 | Klassen et al. | |

OTHER PUBLICATIONS

Office Action dated Sep. 22, 2011, U.S. Appl. No. 12/494,025, filed Jun. 29, 2009.
Notice of Allowance dated Jan. 9, 2012, U.S. Appl. No. 12/494,025, filed Jun. 29, 2009.

* cited by examiner

*Primary Examiner* — Raymond Dean

(57) ABSTRACT

A system is provided for push-to-talk voice messages. The system includes a processor and a voice message component. When executed by the processor, the voice message component identifies a request from a first handset to communicate with a second handset via push-to-talk communication, and determines whether the second handset is available. If the second handset is not available, the voice message component stores a voice communication associated with the request in an audio file identifies a voice mail storage associated with the second handset, and provides the audio file to the voice mail storage. The voice message component also informs the first handset that the second handset is not available and that the voice mail storage stores the voice communication.

20 Claims, 5 Drawing Sheets

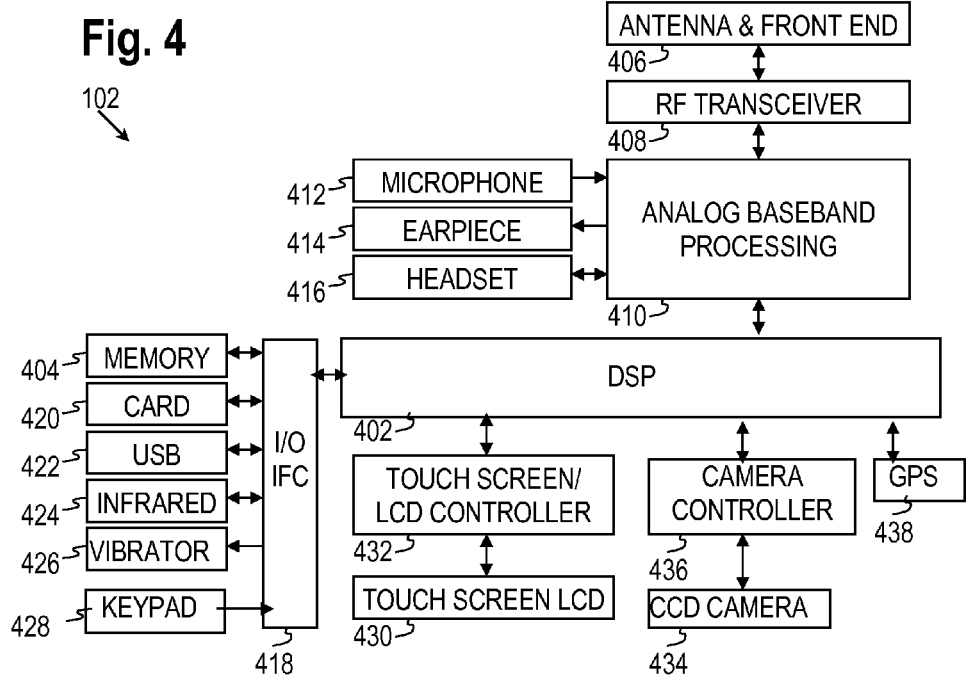
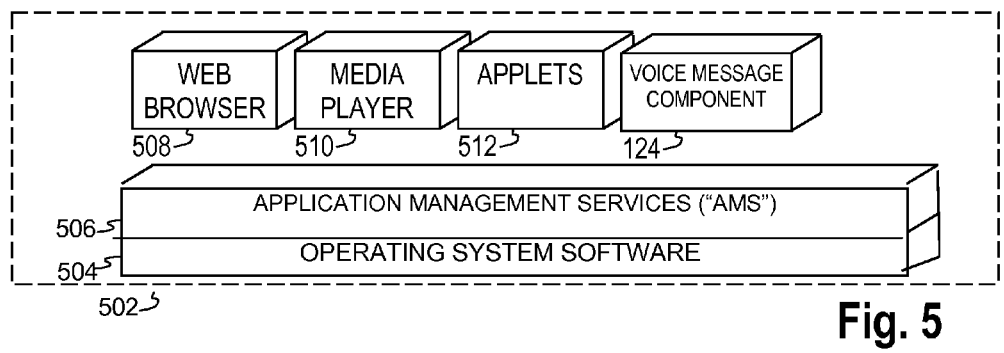

PUSH-TO-TALK VOICE MESSAGES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

Push-to-talk, also known as press-to-transmit, is a method of conversing on half-duplex communication lines using a momentary button to switch from voice reception mode to transmit mode. Push-to-talk, or push-to-talk over cellular, may be provided over a handset communication network as a feature similar to walkie-talkie. A handset may be a mobile phone, a wireless communication device, a pager, a personal digital assistant, a portable computer, a tablet computer, a laptop computer, a digital camera, a digital music player, a digital calculator, an electronic key fob for keyless entry, a media player, or an inventory control device.

A typical push-to-talk connection connects rapidly. In some deployments, a push-to-talk connection may typically be established less than one second after activation of the momentary button. One significant advantage of push-to-talk is allowing a single person to reach an active talk group at a button press, thus users no longer need to make several calls to coordinate with a group. Push-to-talk calls are half duplex communications—while one person speaks, the other(s) listen. Traditional mobile phone networks and devices utilize full-duplex communications, allowing customers to call other persons on a mobile or land-line network and be able to simultaneously talk and hear the other party. Full-duplex communications require a connection to be started by dialing a phone number and the other party answering the call, and the connection remains active until either party ends the call or the connection is dropped due to signal loss or a network outage. Full-duplex communications typically do not allow for casual transmissions to be sent to other parties on the network without first dialing them up, as is provided by two-way radios. Full-duplex operation on mobile phone networks is made possible by using separate frequencies for transmission and reception. Some handset communication providers offer mobile push-to-talk service via functionality for individual half-duplex transmissions that are sent to another party on the system without needing an existing connection to be already established. Since such communications are half-duplex, utilizing a single frequency, only one user can transmit by push-to-talk at a time, and the other party is unable to transmit until the transmitting user un-keys their push-to-talk button.

SUMMARY OF THE INVENTION

In an embodiment, a system is provided for push-to-talk voice messages. The system includes a processor and a voice message component. When executed by the processor, the voice message component identifies a request from a first handset to communicate with a second handset via push-to-talk communication, and determines whether the second handset is available. If the second handset is not available, the voice message component stores a voice communication associated with the request in an audio file, identifies a voice mail storage associated with the second handset, and provides the audio file to the voice mail storage. The voice message component also informs the first handset that the second handset is not available and that the voice mail storage stores the voice communication.

In an embodiment, a method is provided for push-to-talk voice messages. A request is identified from a first handset to communicate with a second handset via push-to-talk communication. A determination is made whether the second handset is available. If the second handset is not available, a voice communication associated with the request is stored in an audio file, a voice mail storage associated with the second handset is identified, and the audio file is provided to the voice mail storage. The first handset is informed that the second handset is not available and that the voice mail storage stores the voice communication. An offer is made to the first handset to inform the first handset when the second handset is available, and in response to the first handset selecting the offer, the first handset is informed that the second handset is available.

In an embodiment, a system is provided for push-to-talk voice messages. The system includes a processor and a voice message component. When executed by the processor, the voice message component identifies a request from a first handset to communicate with a second handset via push-to-talk communication and determines whether the second handset is available. If the second handset is not available, the voice message component informs the first handset that the second handset is not available and that a voice mail storage is available to store a voice communication. The voice message component receives the voice communication, stores the voice communication in an audio file, identifies the voice mail storage associated with the second handset, and provides the audio file to the voice mail storage.

In an embodiment, a method of push-to-talk messages is provided. The method comprises attempting to initiate with a first handset a full-duplex voice call to a second handset and in response to the first handset attempting to initiate the full-duplex voice call, presenting a message on a display of the first handset promoting completing the call over a push-to-talk network.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 shows a block diagram of an illustrative handset.

FIG. 5 shows a block diagram of an illustrative software configuration for a handset.

DETAILED DESCRIPTION

Figure 1:
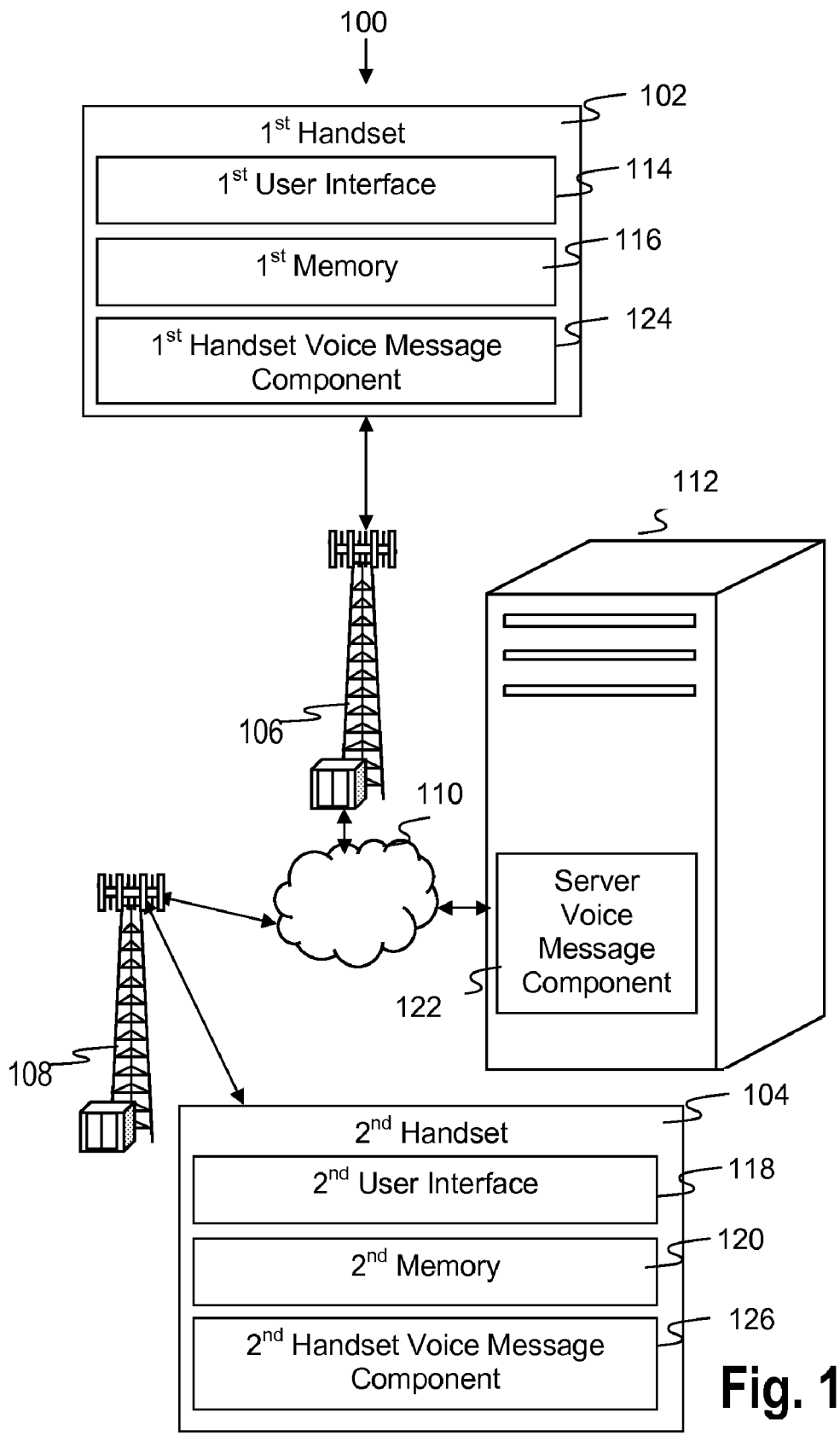
FIG. 1 shows a block diagram of a system for push-to-talk voice messages according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

When a first handset user attempts to contact a second handset user via push-to-talk communication, the second handset may not be available for push-to-talk communication. The second handset may not be available because the second handset user is using the second handset for full-duplex communication, data communication, or half-duplex communication with another handset, or because push-to-talk communication is not currently enabled for the second handset, such as when the second handset is powered off or in airplane mode. While full-duplex communications offer a caller the option of leaving a voice mail message when calling a handset user that is not available to respond to a call, half-duplex communications typically do not offer such an option. Therefore, the first handset user is typically limited to receiving a notification that the second handset is not available, such as a notification by an audio signal or a display of a text message. The first handset user may not have any way of leaving a message with the second handset until the second handset is available, and the first handset user may not have any way of knowing when the second handset becomes available.

Embodiments of the pending disclosure provide systems and methods for push-to-talk voice messages. A voice message component, such as a component executing on a communication server, identifies a request from a first handset to communicate with a second handset via push-to-talk communication, and determines whether the second handset is available. If the second handset is not available, the voice message component may store a voice communication associated with the request in an audio file, identify a voice mail storage associated with the second handset, and provide the audio file to the voice mail storage. For example, if a supervisor attempts to call an engineer via push-to-talk communications, and says "Meet me in the break room at 2:30," the voice message component records the supervisor's comment in an audio file. The voice message component may use the engineer's push-to-talk number to identify the handset number for the engineer's full-duplex communication, identify the voice mail storage for the engineers full-duplex communication, and store the audio file of the supervisor's comment in the identified voice mail storage. The voice message component may inform the first handset that the second handset is not available and that the voice mail storage stores the voice communication. For example, the supervisor's handset displays a text message that specifies that the engineer's handset is not available, and the supervisor's comment has been stored in the engineer's voice mail storage. For this example, the supervisor does not have to repeat the message about the 2:30 meeting again, and the supervisor handset is informed that the engineer can receive this message the next time that the engineer's handset is available.

In addition to recording whatever a push-to-talk caller may have said before the caller was aware that the called handset was not available, the voice message component also may inform any calling handset that voice mail storage is available to store any subsequent voice communication. For example, the supervisor's handset offers the supervisor the option to leave a message, such as "Bring your schematics to the meeting." The voice message component receives the voice communication, stores the voice communication in an audio file, identifies the voice mail storage associated with the second handset in response to storing the voice communication, and provides the audio file to the voice mail storage. For example, the voice message component records the supervisor's comment about schematics on an audio file. If it has not already done so, the voice message component may use the engineer's push-to-talk number to identify the handset number for the engineer's full-duplex communication and identify the voice mail storage for the engineer's full-duplex communication. The voice mail component may store the audio file of the supervisor's comment about schematics in the identified voice mail storage. In this example, the supervisor handset is informed that the engineer can receive this message about schematics the next time that the engineer's handset is available. The pending disclosure provides the option to store voice messages for push-to-talk communications using the full-duplex voice mail storage capabilities that already exist for a handset.

In an embodiment, the push-to-talk communication system may employ voice over internet protocol (VoP) technology, which is a data packetized technology that differs from traditional voice wireless communication such as code division multiple access (CDMA) and global system for mobile communication (GSM) wireless communication. In an embodiment, the packetized voice data of the first handset may be aggregated into a file by the voice message component including metadata that identifies the push-to-talk number of the first handset, the full-duplex phone number of the first handset, and optionally a user tag and/or user name associated with the first handset. In an embodiment, the file may be stored in a push-to-talk mail box for subsequent access and playback by the second handset. Alternatively, in another embodiment, the voice message component may convert the file to a format suitable for storing to a traditional voicemail box associated with the second handset, for example a voice mailbox associated with a full-duplex wireless communication service associated with the second handset. For example, the voice message component may playback the packetized data contained in the file storing the voice over internet protocol message, encode the playback stream using the codec associated with the full-duplex wireless communication technology, and store the encoded audio in the traditional voicemail box. In this alternative embodiment, the voice message component may further link some or all of the metadata to the encoded audio stored in the traditional voice mailbox.

FIG. 1 shows a block diagram of a system 100 for push-to-talk voice messages according to some embodiments of the present disclosure. The system 100 includes a first handset 102, a second handset 104, a first base transceiver station (BTS) 106, a second base transceiver station 108, a network 110, and a communication server 112. The first handset 102 and the second handset 104 may communicate with each other and with the communication server 112 via the base transceiver station's 106-108 and the network 110. The first handset 102 includes a first user interface 114 and a first memory 116. The second handset 104 includes a second user interface 118 and a second memory 120.

The communication server 112 may execute a server voice message component 122, the first handset 102 may execute a first handset voice message component 124, and the second handset 104 may execute a second handset voice message component 126. Although some examples may describe the server voice message component 122 taking an action, and other examples may describe the handset voice message components 124-126 taking other actions, each action in the present disclosure may be taken by the server voice message component 122, the first handset voice message component 124, the second handset voice message component 126, or any combination of the voice message components 122-126. The handset voice message components 124-126 may execute some local actions, such as identifying a request to communicate via push-to-talk communication or determining whether the handsets 102-104 are available, that alleviate the requirement for the server voice message component 122 to monitor numerous distributed handsets 102-104. In examples described below, the first handset 102 may be referred to as the supervisor handset 102 and the second handset 104 may be referred to as the engineer handset 104.

Any of the voice message components 122-126 may identify a request from the first handset 102 to communicate with the second handset 104 via push-to-talk communication, and determine whether the second handset 104 is available. For example, after receiving a request from the supervisor handset 102 to communicate with the engineer handset 104 via push-to-talk communication, the server voice message component 122 determines whether the engineer handset 104 is available.

Any of the voice message components 122-126 may enable the first handset 102 to communicate with the second handset 104 via push-to-talk communication in response to a determination that the second handset 104 is available. For example, if the engineer handset 104 is available, the server voice message component 122 enables the supervisor handset 102 to communicate with the engineer handset 104 via push-to-talk communication.

If the second handset 104 is not available, any of the voice message components 122-126 may store a voice communication associated with the request in an audio file. For example, if the engineer handset 104 is currently busy in a data communication session, and the supervisor attempts to call the engineer via push-to-talk communications and says "Meet me in the break room at 2:30," the server voice message component 122 records the supervisor's comment on an audio file. In an embodiment, the push-to-talk technology may be implemented using voice over internet protocol, and the audio file may be created as a data file including metadata about the originator handset and/or the terminator handset, for example the first handset 102 and/or the second handset 104 respectively. In an embodiment, the data file may be converted from packetized data to a traditional audio format such as is used in traditional voicemail message boxes and stored in the voicemail message box associated with the terminator handset, for example associated with the second handset 104. For example, in an embodiment, the voice message components 122-126 may playback the packetized data contained in the data file storing the voice over internet protocol message as an audio signal, encode the audio signal using the codec associated with the full-duplex wireless communication technology, and store the encoded audio in the traditional voicemail message box.

Any of the voice message components 122-126 may identify a voice mail storage associated with the second handset 104. For example, the server voice message component 122 identifies the voice mail storage associated with the engineer handset 104 by identifying a full-duplex voice number associated with the engineer handset 104, and identifying the voice mail storage associated with the full-duplex voice number. In contrast to the full-duplex voice numbers, which may be referred to as mobile directory numbers, which the handsets 102-104 use to communicate via full-duplex voice calls, the handsets 102-104 may use push-to-talk identifiers to communicate via half-duplex push-to-talk communication. Push-to-talk identifiers may be urban fleet market identifiers (UFMID's), which are a series of characters that may be used to enable push-to-talk communications between the handsets 102-104 similar to, but distinct from, the use of telephone numbers that enable voice calls between the handsets 102-104. In an embodiment, a UFMID may comprise ten characters, such as 123*4*1234. The handsets 102-104 may enable push-to-talk communication via one technology network and communicate voice calls via a second technology network. For example, the supervisor handset 102 may enable push-to-talk communication via an integrated digital enhanced network (IDEN) communication technology or a code division multiple access (CDMA) technology. In another example, the supervisor handset 102 may communicate voice calls via a CDMA technology, a global system for mobile communication (GSM) technology, a universal mobile telecommunications system (UMTS) technology, a long-term evolution (LTE) technology, or a worldwide interoperability for microwave access (WiMAX) technology.

Any of the voice message components 122-126 may provide the audio file to the voice mail storage. For example, the server voice message component 122 converts the audio file's format to the voice mail storage's format and stores the converted audio file to the voice mail storage. Any of the voice message components 122-126 also may add a voice-based identifier file to the audio file. For example, the server voice message component 122 adds a copy of the supervisor's voice mail identification to the message, so that the engineer may hear the voice message as "'Supervisor' left the message 'Meet me in the break room at 2:30' at 2:25 PM on Monday." In an embodiment, the push-to-talk number of the originator handset, for example the supervisor's push-to-talk number, may be provided along with the message, for example in a display of the receiver handset, to promote convenient callback by the receiver handset, for example the engineer's handset 104.

Any of the voice message components 122-126 may inform the first handset 102 that the second handset 104 is not available and that the voice mail storage stores the voice communication. For example, the server voice message component 122 informs the supervisor handset 102 that the engineer handset 104 is not available by providing an audio message and/or a text message, and any message also indicates that the supervisor's message has been stored in the engineer's voice mail storage. In this example, the supervisor does not have to repeat the message about the 2:30 meeting again, and the supervisor's handset 102 is informed that the engineer can receive this message the next time that the engineer's handset 104 is available.

Any of the voice message components 122-126 may provide an offer to inform the first handset 102 when the second handset 104 is available, determine whether the offer is selected, and inform the first handset 102 that the second handset 104 is available in response to a determination that the offer is selected. For example, the server voice message component 122 offers to inform the supervisor handset 102 when the engineer handset 104 is available. If the supervisor handset 102 selects this option, the server voice message component 122 informs the supervisor handset 102 when the engineer handset 104 is available. Therefore, if the supervisor wants to discuss something with the engineer in addition to or instead of leaving a message for the engineer, the supervisor may select this notification option.

Any of the voice message components 122-126 may inform the second handset 104 of the request from the first handset 102 to communicate with the second handset 104 via push-to-talk communication. For example, the server voice message component 122 may inform the engineer handset 104 of the missed call from the supervisor handset 102 while the engineer handset 104 is communicating in a data session and/or after the engineer handset 104 is available again.

Any of the voice message components 122-126 may inform the second handset 104 that the voice mail storage stores the voice communication and may inform the second handset 104 of an identity associated with the first handset 102 associated with the request. For example, the server voice message component 122 sends a message to the engineer handset 104 that indicates that the supervisor left a message with the voice mail storage.

Any of the voice message components 122-126 may provide the voice communication to the second handset 104 from the voice mail storage in response to a request from the second handset 104 to provide the voice communication. For example, if the second handset 104 requests the message in the voice mail storage, the server voice message component 122 provides the message about the meeting to the second handset 104.

In addition to recording whatever a push-to-talk caller may have said before the caller was aware that the called handset was not available, any of the voice message components 122-126 also may inform any calling handset that voice mail storage is available to store any subsequent voice communication. For example, the first handset 102 offers the supervisor the option to leave a message, such as "Bring your schematics to the meeting." Any of the voice message components 122-126 receives the voice communication and stores the voice communication in an audio file. For example, the server voice message component 122 records the supervisor's comment about schematics on an audio file. If it has not already done so for any prior messages recorded as audio files, the server voice message component 122 may use the engineer's push-to-talk number to identify the handset number for the engineer's full-duplex communication and to identify the voice mail storage for the engineer's full-duplex communication. The server voice message component 122 may store the audio file of the supervisor's comment about schematics in the identified voice mail storage. In this example, the first handset 102 is informed that the engineer can receive the supervisor's message the next time that the second handset 104 is available. The pending disclosure provides the option to store voice messages for push-to-talk communications using the full-duplex voice mail storage capabilities that already exist for the handsets 102-104. For example, a packetized data of a push-to-talk communication is recorded into a data file. Metadata may be added to the data file identifying one or both of the called party, for example the second handset 104, and the calling party, for example the first handset 102. The metadata may comprise the push-to-talk number of the called and/or the calling party, the regular voice phone number of the called and/or the calling party, and the tag and/or name of the called and/or the calling party. The data file is converted to a format compatible with the full-duplex voicemail storage system, for example a voicemail message box. Converting the format of the data file may include converting the voice over internet protocol digital packets to the audio format associated with the full-duplex voicemail message box, for example by playing back the data file to generate an audio signal and then encoding the audio signal using the codec employed by the subject full-duplex wireless voice communication system. This is by contrast with a traditional voicemail message box, for example a code division multiple access (CDMA) or a global system for mobile communication (GSM) voicemail message box, where the voice signal may be encoded for transmission using a codec by the originating handset and decoded using the same codec by the terminating handset, and wherein the recording of the voice for storage in the voicemail message box may be stored in the codec encoded format, without any reformatting or substantive transformation that is triggered by handling the voicemail—the on-going encoded audio stream is simply piped to the voicemail message box.

After providing any voice messages to the second handset 104, any of the voice message components 122-126 may prompt the second handset 104 to respond to the first handset 102 via push-to-talk communication. For example, the server handset voice message component 122 prompts the engineer handset 104 with a message that suggests communicating via push-to-talk communication with the supervisor handset 102 as an alternative to communicating with the supervisor handset 102 via a voice call. The message may indicate that a push-to-talk communication may incur smaller service plan charges for the engineer handset 104 than a voice call incurs. The message also may display the remaining funds on a prepaid plan or the current monthly charges for a post-paid plan as incentives for the engineer handset 104 to communicate with the supervisor handset 102 via push-to-talk communications. The message may indicate that the periodic allocation of voice minutes, for example the monthly allocation of voice minutes provided by a wireless communication service subscription plan, may be approaching exhaustion.

Any of the voice message components 122-126 may prompt the second handset 104 with a message that suggests communication via push-to-talk communications when an attempt is made to initiate a voice call, before the call origination involves network equipment, for example before the call origination propagates to the base transceiver station 106 from the second handset 104. For example, when the engineer handset 104 attempts to initiate a voice call to the supervisor handset 102 by entering a voice number of the supervisor handset 102, the second handset voice message component 126 may determine that the standard wireless voice communication system currently provides poor or no coverage and may prompt with a suggestion to use push-to-talk communication to reach the supervisor handset 102 instead. In another example, the prompt may include the push-to-talk contact identifier of the supervisor handset 102 which may be determined by the engineer handset 104 based on the voice number initially entered into the engineer handset 104, for example by using the voice number to index into a contact list and finding the push-to-talk contact identifier of the supervisor handset 102.

The second handset voice message component 126 may selectively prompt with the suggestion to communicate via push-to-talk communications based on a current account balance, based on a remaining number of periodically allocated voice minutes, and/or based on a current voice wireless coverage at the second handset 104. In yet another example, when the engineer handset 104 presents a message from the supervisor handset 102 on a display of the engineer handset 104, for example a text message, an email, a dialog box to select a voice message for playback, or another message, the message may be presented along with a selectable push-to-talk contact identifier of the supervisor handset 102. Thus, when viewing or listening to a message from the supervisor handset 102, the engineer handset 104 may provide the engineer with a convenient means for readily initiating a push-to-talk communication with the supervisor handset 102, for example to further pursue the topic of the message about the meeting.

Figure 2:
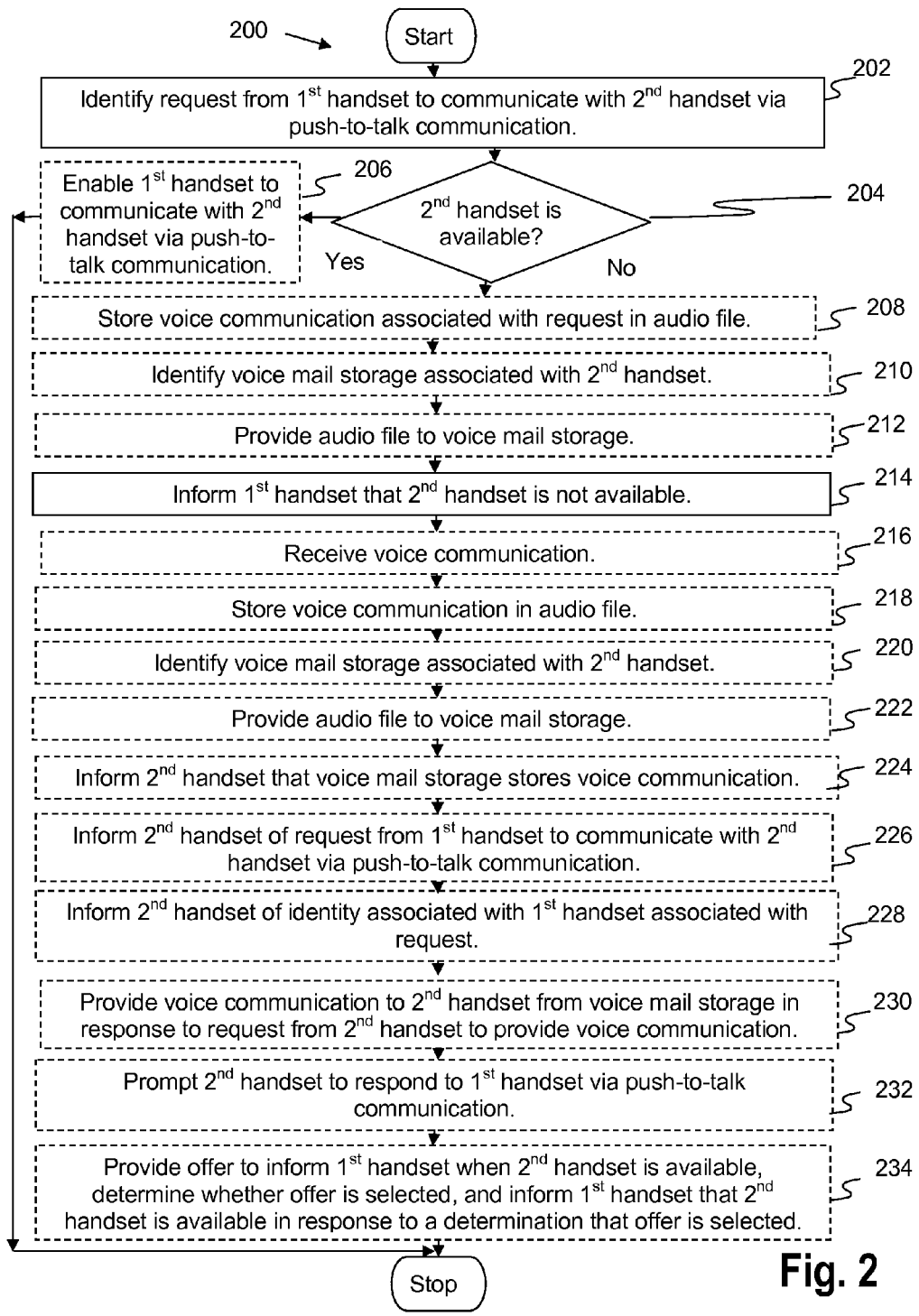
FIG. 2 shows a flowchart of a method for push-to-talk voice messages according to some embodiments of the present disclosure.

FIG. 2 shows a flowchart of a method 200 for push-to-talk voice messages according to some embodiments of the present disclosure. The system 100 can execute the method 200 to provide voice message capabilities for push-to-talk communications.

In box 202, a request is identified from a first handset to communicate with a second handset via push-to-talk communication. For example, the server voice message component 122 identifies a request from the supervisor handset 102 to communicate via push-to-talk with the engineer handset 104.

In box 204, a determination is made whether a second handset is available. For example, the server voice message component 122 determines whether the engineer handset 104 is available. If the second handset 104 is available, the method 200 continues to box 206. If the second handset 104 is not available, the method 200 proceeds to box 208.

In box 206, a first handset is optionally enabled to communicate with a second handset via push-to-talk communication. For example, the server voice message component 122 enables the supervisor handset 102 to communicate with the engineer handset 104 via push-to-talk communication.

In box 208, a voice communication associated with a request to initiate push-to-talk communication is optionally stored in an audio file. For example, the server voice message component 122 stores a message about a meeting in an audio file.

In box 210, a voice mail storage associated with a second handset is optionally identified. For example, the server voice message component 122 identifies a voice mail storage associated with the engineer handset 104.

In box 212, an audio file is optionally provided to a voice mail storage. For example, the server voice message component 122 provides the message about the meeting to the voice mail storage.

In box 214, a first handset is informed that a second handset is not available. For example, the server voice message component 122 informs the supervisor handset 102 that the engineer handset 104 is not available.

In box 216, a voice communication is optionally received. For example, the server voice message component 122 receives a message about the schematics.

In box 218, a voice communication is optionally stored in an audio file. For example, the server voice message component 122 stores the message about the schematics in an audio file.

In box 220, a voice mail storage associated with a second handset is optionally identified. For example, the server voice message component 122 identifies the voice mail storage associated with the engineer handset 104.

In box 222, an audio file is optionally provided to a voice mail storage. For example, the server voice message component 122 provides the message about the schematics to the voice mail storage.

In box 224, a second handset is optionally informed that a voice mail storage stores a voice communication. For example, the server voice message component 122 informs the engineer handset 104 that the voice mail storage stores the message about the schematics.

In box 226, a second handset is optionally informed of a request from a first handset to communicate with the second handset via push-to-talk communication. For example, the server voice message component 122 informs the engineer handset 104 of the missed call from the supervisor handset 102.

In box 228, a second handset is optionally informed of an identity associated with a first handset associated with a request. For example, the server voice message component 122 informs the engineer handset 104 that the supervisor handset 102 initiated the missed call.

In box 230, a voice communication is optionally provided to a second handset from a voice mail storage in response to a request from the second handset to provide the voice communication. For example, the server voice message component 122 provides the messages about the meeting and the schematics to the engineer handset 104.

In box 232, a second handset is optionally prompted to respond to a first handset via push-to-talk communication. For example, the server voice message component 122 prompts the engineer handset 104 to contact the supervisor handset 102 via push-to-talk communication.

In box 234, an offer is optionally provided to inform a first handset when a second handset is available, a determination is optionally made whether the offer is selected, and a first handset is optionally informed that the second handset is available in response to a determination that the offer is selected. For example, the server voice message component 122 informs the supervisor handset 102 that the engineer handset 104 is available.

Figure 3:
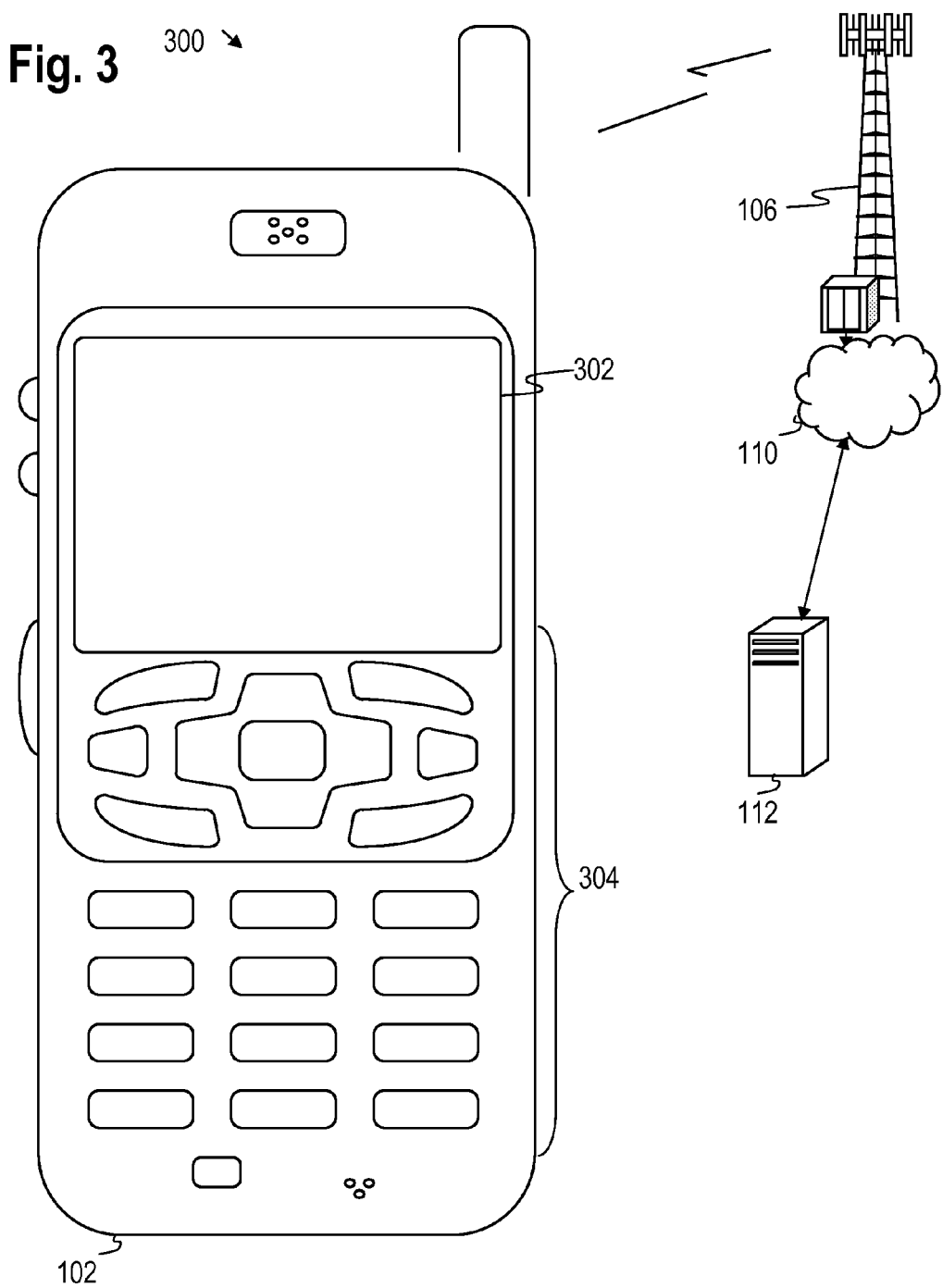
FIG. 3 shows an illustrative wireless communications system.

FIG. 3 shows a wireless communications system 300 including the first handset 102. FIG. 3 depicts the first handset 102, which is operable for implementing aspects of the present disclosure, but the present disclosure should not be limited to these implementations. Though illustrated as a mobile phone, the first handset 102 may take various forms including a telephone, a mobile phone, a wireless handset, a pager, a personal digital assistant (PDA), a portable computer, a tablet computer, a laptop computer, a digital camera, a digital music player, a digital calculator, an electronic key fob for keyless entry, a media player, an inventory control device, and a desktop phone. Many suitable handsets 102 combine some or all of these functions. In some embodiments of the present disclosure, the first handset 102 is not a general purpose computing device, but rather is a special-purpose communications device such as a mobile phone, wireless communication device, pager, or PDA. The first handset 102 may support specialized activities such as gaming, inventory control, job control, and/or task management functions, and so on.

The first handset 102 includes the user interface 114, which may include a display 302 and a touch-sensitive surface or keys 304 for input by a user. The first handset 102 may present options for the user to select, controls for the user to actuate, and/or cursors or other indicators for the user to direct. The first handset 102 may further accept data entry from the user, including numbers to dial or various parameter values for configuring the operation of the first handset 102. The first handset 102 may further execute one or more software or firmware applications in response to user commands. These applications may configure the first handset 102 to perform various customized functions in response to user interaction. Additionally, the first handset 102 may be programmed and/or configured over-the-air, for example from a wireless base station, a wireless access point, or a peer handset 104.

The first handset 102 may execute a web browser application which enables the display 302 to show a web page. The web page may be obtained via wireless communications with the base transceiver station 106, a wireless network access node, a peer handset 104 or any other wireless communication network or system. While two base transceiver stations 106 and 108 are illustrated, it is understood that the wireless communication system may comprise any number of base transceiver stations. In some instances, the first handset 102 may be in communication with multiple base transceiver stations 106-108 at the same time. The base transceiver stations 106-108 (or wireless network access node) are coupled to the network 110. Via the wireless link and the network 110, the first handset 102 has access to information on various servers, such as the communication server 112. The communication server 112 may provide content which may be shown on the display 302. Alternately, the first handset 102 may access the base transceiver stations 106-108 through a peer handset 104 acting as an intermediary, in a relay type or hop type of connection.

FIG. 4 shows a block diagram of the first handset 102. While a variety of known components of communication devices 102 are depicted, in an embodiment a subset of the listed components and/or additional components not listed may be included in the first handset 102. The first handset 102 includes a digital signal processor (DSP) 402 and a memory 404. As shown, the first handset 102 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438. In an embodiment, the first handset 102 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the first handset 102 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the first handset 102 to send and receive information from a radio access network (RAN) or some other available wireless communications network or from a peer handset 104. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF transceiver 408, portions of the antenna and front end 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset port 416 and outputs to the earpiece speaker 414 and the headset port 416. To that end, the analog baseband processing unit 410 may have ports for connecting to the built-in microphone 412 and the earpiece speaker 414 that enable the first handset 102 to be used as a mobile phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the first handset 102 to function as a peripheral device to voice message information with a personal computer or other computer system. The infrared port 424 and other optional ports such as a Bluetooth interface or an IEEE 802.11 compliant wireless interface may enable the first handset 102 to communicate wirelessly with other nearby communication devices 104 and/or wireless base stations.

The input/output interface 418 may further connect the DSP 402 to the vibrator 426 that, when triggered, causes the first handset 102 to vibrate. The vibrator 426 may serve as a mechanism for silently alerting the user to any of various events such as an incoming call, a new text message, and an appointment reminder.

The keypad 428 couples to the DSP 402 via the interface 418 to provide one mechanism for the user to make selections, enter information, and otherwise provide input to the first handset 102. Another input mechanism may be the touch screen LCD 430, which also may display text and/or graphics to the user. The touch screen LCD controller 432 couples the DSP 402 to the touch screen LCD 430.

The CCD camera 434 enables the first handset 102 to take digital pictures. The DSP 402 communicates with the CCD camera 434 via the camera controller 436. The GPS sensor 438 is coupled to the DSP 402 to decode global positioning system signals, thereby enabling the first handset 102 to determine its position. In another embodiment, a camera operating according to a technology other than charge coupled device cameras may be employed. Various other peripherals may also be included to provide additional functions, e.g., radio and television reception.

FIG. 5 illustrates a software environment 502 that may be implemented by the DSP 402. The DSP 402 executes operating system drivers 504 that provide a platform from which the rest of the software operates. The operating system drivers 504 provide drivers for the handset hardware with standardized interfaces that are accessible to application software. The operating system drivers 504 include application management services ("AMS") 506 that transfer control between applications running on the first handset 102. Also shown in FIG. 5 are a web browser application 508, a media player application 510, JAVA applets 512, and the voice message component 124. The web browser application 508 configures the first handset 102 to operate as a web browser, allowing a user to enter information into forms and select links to retrieve and view web pages. The media player application 510 configures the first handset 102 to retrieve and play audio or audiovisual media. The JAVA applets 512 configure the first handset 102 to provide games, utilities, and other functionality.

Figure 6:
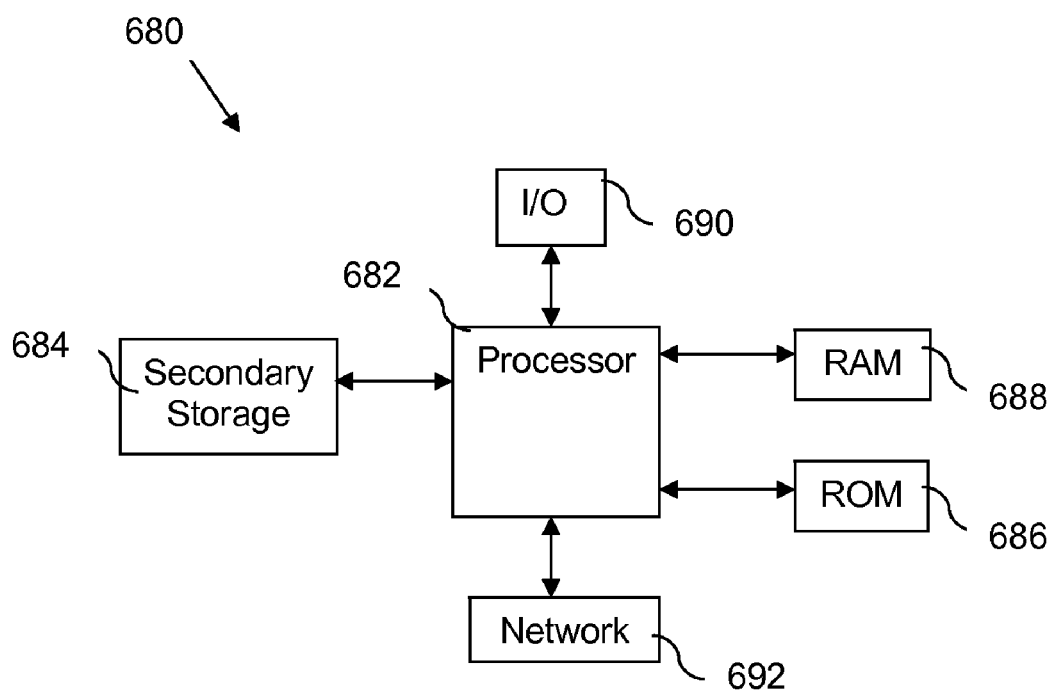
FIG. 6 shows an illustrative computer system suitable for implementing portions of the several embodiments of the present disclosure.

Some aspects of the system described above may be implemented on a computer with sufficient processing power, memory resources, and network throughput capability to handle the necessary workload placed upon it. FIG. 6 illustrates a typical computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 692 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for push-to-talk voice messages, comprising:
   a processor; and
   a voice message component that, when executed by the processor,
      identifies a request from a first handset to communicate with a second handset via push-to-talk communication,
      receives a voice communication associated with the request,
      subsequently determines whether the second handset is available,
      stores the voice communication associated with the request in an audio file in response to a determination that the second handset is not available,
      identifies a voice mail storage associated with the second handset in response to storing the voice communication,
      provides the audio file to the voice mail storage, and
      subsequently informs the first handset that the second handset is not available and that the voice mail storage stores the voice communication.

2. The system of claim 1, wherein the voice message component comprises a first handset voice message component executed on the first handset and a second handset voice message component executed on the second handset.

3. The system of claim 1, wherein the voice message component comprises a server voice message component executed on a communication server.

4. The system of claim 1, wherein the audio file comprises packetized data, wherein the voice message component further plays back the packetized data as an audio stream, encodes the audio stream using a codec associated with the voice mail storage, and provides the encoded audio stream to the voice mail storage.

5. The system of claim 1, wherein the push-to-talk communication is via a first technology network, the voice mail storage is associated with a second technology network, and wherein the first technology network and the second technology network comprise different technology networks.

6. The system of claim 5, wherein the first technology network communicates via one of an integrated digital enhanced network (IDEN) communication technology and a code division multiple access (CDMA) technology.

7. The system of claim 5, wherein the second technology network communicates via one of a code division multiple access (CDMA) technology, a global system for mobile communication (GSM) technology, a universal mobile telecommunications system (UMTS) technology, a long-term evolution (LTE) technology, and a worldwide interoperability for microwave access (WiMAX) technology.

8. The system of claim 1, wherein the voice message component further enables the first handset to communicate with the second handset via push-to-talk communication in response to a determination that the second handset is available.

9. A computer implemented method for push-to-talk voice messages, comprising:
   identifying a request from a first handset to communicate with a second handset via push-to-talk communication;
   receiving a voice communication associated with the request;
   subsequently determining whether the second handset is available;
   storing the voice communication associated with the request in an audio file in response to a determination that the second handset is not available;
   identifying a voice mail storage associated with the second handset in response to storing the voice communication;
   providing the audio file to the voice mail storage;
   subsequently informing the first handset that the second handset is not available and that the voice mail storage stores the voice communication;
   subsequently providing an offer to the first handset to inform the first handset when the second handset is available to receive push-to-talk communications; and
   in response to the first handset selecting the offer, informing the first handset that the second handset is available to receive push-to-talk communications.

10. The computer implemented method of claim 9, wherein identifying the voice mail storage associated with the second handset comprises identifying a mobile directory number associated with the second handset, and identifying the voice mail storage associated with the mobile directory number.

11. The computer implemented method of claim 9, wherein the audio file comprises packetized data and wherein providing the audio file to the voice mail storage comprises converting the packetized data to an audio stream, encoding the audio stream with a codec associated with a full-duplex wireless communication system, and storing the encoded audio in the voice mail storage.

12. The computer implemented method of claim 9, wherein providing the audio file to the voice mail storage comprises adding a voice-based identifier file to the audio file.

13. The computer implemented method of claim 9, wherein informing the first handset that the second handset is not available comprises providing at least one of an audio message and a text message.

14. The computer implemented method of claim 9, further comprising informing the second handset that the voice mail storage stores the voice communication.

15. The computer implemented method of claim 14, further comprising providing the voice communication to the second handset from the voice mail storage in response to a request from the second handset to provide the voice communication.

16. The computer implemented method of claim 9, further comprising informing the second handset of the request from the first handset to communicate with the second handset via push-to-talk communication.

17. The computer implemented method of claim 16, further comprising informing the second handset of an identity associated with the first handset associated with the request.

18. The computer implemented method of claim 9, further comprising prompting the second handset to respond to the first handset via push-to-talk communication.

19. The system of claim 1, wherein the voice message component subsequently informs the first handset that voice mail storage is available to store at least one subsequent voice communication.

20. The system of claim 19, wherein the voice message component further:
- subsequently receives the at least one subsequent voice communication,
- stores the at least one subsequent voice communication in a second audio file,
- identifies the voice mail storage associated with the second handset in response to storing the at least one subsequent voice communication, and
- provides the second audio file to the voice mail storage.

* * * * *